United States Patent Office 3,849,410
Patented Nov. 19, 1974

3,849,410
PIPERAZINE DERIVATIVES
Michio Nakanishi, Oita, and Takanori Oe and Chiaki Tashiro, Fukuoka, Japan, assignors to Yoshitomi Pharmaceutical Industries, Ltd., Osaka, Japan
No Drawing. Filed Apr. 10, 1972, Ser. No. 242,770
Claims priority, application Japan, Apr. 10, 1971, 46/22,549
Int. Cl. C09b 23/00; C07d 51/72
U.S. Cl. 260—240 TC       8 Claims

ABSTRACT OF THE DISCLOSURE

N-substituted piperazine compounds of the formula

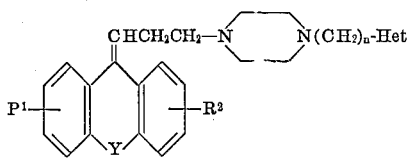

wherein Y is —$CH_2$—O—, —$CH_2$—S—, —$CH_2$—$SO_2$—, —$CH_2$—$CH_2$—, —CH=CH—, —C($CH_3$)$_2$—, —O— or —S—, each of $R^1$ and $R^2$ is H, $C_{1-4}$ alkyl, methoxy, methylthio or halogen and Het represents furyl, pyridyl or thienyl and pharmaceutically acceptable acid addition salts thereof are useful, for example, as psychotropic agents.

---

This invention relates to novel and therapeutically valuable piperazine derivatives of the general formula

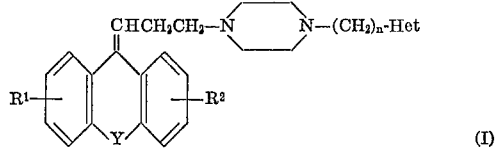

and pharmaceutically acceptable acid addition salts thereof, wherein Y is —$CH_2$—O—, —$CH_2$—S—,

—$CH_2$—$SO_2$—,

—$CH_2$—$CH_2$—, —CH=CH—, —C($CH_3$)$_2$—, —O— or —S—, each of $R^1$ and $R^2$ is H, $C_{1-4}$ alkyl (e.g. methyl, ethyl, propyl, isopropyl, butyl or tertiary butyl), methoxy, methylthio or halogen (F, Cl or Br), Het represents furyl, pyridyl or thienyl and n is 0, 1, 2 or 3.

The compounds (I) can be produced by reacting a compound of the formula

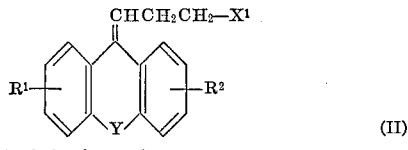

with a compound of the formula $$X^2—(SH_2)_n\text{-Het} \quad\quad (III)$$

wherein one of $X^1$ and $X^2$ is a reactive atom or radical such as halogen (Cl, Br or I), methylsulfonyloxy, phenylsulfonyloxy or p-tolylsulfonyloxy, and the other is 1-piperazinyl.

The reaction is advantageously carried out in a solvent at a temperature of from room temperature to reflux temperature for several to ten-odd hours. The said solvent may be selected from the group consisting of benzene, toluene, xylene, ethanol, dioxane, pyridine, acetone, dimethylformamide, dimethylsulfoxide and water and a mixture thereof.

The reaction may be carried out in the presence of a deacidifying or condensing agents such as sodium hydroxide, sodium carbonate, potassium carbonate, triethylamine, pyridine or potassium iodide.

The starting compounds (II) can be produced from a compound of the formula

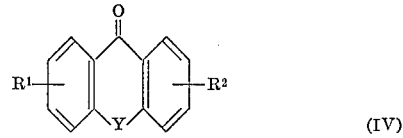

by the methods disclosed in Journal of Organic Chemistry, vol. 27, p. 4134 (1962) and Canadian Pat. No. 717,977 [Chemical Abstracts, vol. 64, 3443b (1966)].

The starting compounds of formula (II) may be obtained as a mixture of two isomers (cis and trans). These isomers may be separated in a conventional manner. However, the separation is not necessary, since the compounds of formula (I) are therapeutically effective also in the form of a mixture of the two corresponding isomers.

The compounds of formula (I) can be converted into acid addition salts in a conventional manner by treatment with various inorganic and organic acids, for example, hydrochloric, sulfuric, maleic, fumaric and tartaric acid.

The compounds of formula (I) and pharmaceutically acceptable acid addition salts thereof are excellent in anticonvulsant effect, antimetrazole effect, suppression of fighting behavior and antimescaline effect as shown, for example, by the following tests.

(i) Anticonvulsant Effect

The test compound was intraperitoneally administered to one group of 6 dd-strain male mice each weighing 20–25 g. After an hour, a silver electrode of an electroshock seizure apparatus [designed by L. A. Woodbury et al.: see, Archieves Internationales de Pharmacodynamie et de Therapie, vol. 42, pp. 72–102 (1952)] was brought into contact with the cornea and an alternating current (2000 volts, 12.5 milliamperes) was applied for 0.2 second to induce convulsion. The $ED_{50}$, the dose required to lower the seizure rate by 50% against the control mice, was determined from the dose-effect correlation curve.

(ii) Antimetrazole Effect

Metrazole (pentylenetetrazole) (150 mg./kg.) was administered subcutaneously to groups each consisting of 6 mice 15 minutes after the intraperitoneal administration of the test compound. The number of dead mice was counted 30 minutes after the administration of metrazole, and then the $ED_{50}$, the dose required to suppress the death rate to 50%, was determined.

(iii) Supression of Fighting Behavior

Fighting episodes were produced in mice by the method described by Tedeschi et al. in Journal of Pharmacology and Experimental Therapeutics, vol. 125, p. 28 ff. (1959). Groups of 8 female mice (4 pairs) were given the test compound orally 60 minutes prior to receiving electric foot-shock for 3 minutes with an interrupted direct current of 530 volts, 1.3 milliamperes, 10 cycles per second. In case 3 fighting episodes or less within 3 minutes were exhibited, the pair of mice was deemed to be suppressed by the test compound. The control mice of 81 pairs showed the fighting episodes of 8.7 times on the average under the same conditions. The $ED_{50}$, the dose required to suppress 50% of fighting pairs, was determined graphically.

(iv) Antimescaline Effect

A modification of the method of R. A. Turner [Screening Method in Pharmacology, edited by R. A. Turner, p. 73, Academic Press (1965)] was used to study the prevention of scratching episodes induced by mescaline. The test compounds were given to groups each of 6 female mice orally 60 minutes prior to treatment with mescaline sulfate (30 mg./kg. intraperitoneal). Ten minutes later, the effect of test compounds of the scratching episodes was observed for 10 minutes. The $ED_{50}$ shows the dose required for prevention of scratching in 50% of the animals.

Results:

| Compound | Anticonvulsant effect, $ED_{50}$ mg./kg. (intraperitoneal) |
|---|---|
| A | 40 |
| B | 90 |
| C | 40 |
| D | 23 |
| E | 28 |
| F | 17 |

| Compound | Antimetrazole effect, $ED_{50}$ mg./kg. (intraperitoneal) |
|---|---|
| A | 15 |
| B | 20 |
| C | 42 |
| D | 17 |
| E | 45 |
| F | 70 |

| Compound | Suppression of fighting behavior, $ED_{50}$ mg./kg. (oral) |
|---|---|
| A | 150 |
| B | 44 |
| C | 28 |
| D | 23 |
| E | 6 |
| F | 40 |

| Compound | Antimescaline effect, $ED_{50}$ mg./kg. (oral) |
|---|---|
| A | 0.3 |
| B | 4.2 |
| C | 5.0 |
| D | 20.0 |
| E | 6.0 |
| F | 6.0 |

Compounds A to F are identified below:

A: 11-[3-(4-(3-pyridylmethyl)-1-piperazinyl)propylidene]-6,11-dihydro-dibenz[b,e]oxepin trihydrochloride (hydrate)
B: 11-[3-(4-(2-pyridylmethyl)-1-piperazinyl)propylidene]-6,11-dihydro-dibenz[b,e]oxepin dimaleate
C: 11-[3-(4-(4-pyridylmethyl)-1-perazinyl)propylidene]-6,11-dihydro-dibenz[b,e]oxepin trihydrochloride (hydrate)
D: 5-[3-(4-(2-(4-pyridyl)ethyl-1-piperazinyl)propylidene]-10,11-dihydro-dibenzyl[a,d]cycloheptene trihydrochloride (hydrate)
E: 5-[3-(4-(2-pyridylmethyl)-1-piperazinyl)propylidene]-10,11-dihydro-dibenz[a,d]cycloheptene trihydrochloride (1/2) hydrate)
F: 5-[3-(4-(3-pyridylmethyl)-1-piperazinyl)-propylidene]-dibenz[a,d]-cycloheptene trihydrochloride (1/2 hydrate)

In view of various tests including those mentioned above, the compounds of the invention represented by formula (I) and pharmaceutically acceptable acid addition salts thereof can be administered safely as psychotropic agents for the treatment of neuroses, schizophrenia, mania, depression and epilepsy, in the form of a pharmaceutical preparation with a suitable and conventional carrier or adjuvant, administrable orally, without harm to the patients.

The pharmaceutical preparations can take any conventional form such as tablets, capsules or powders.

Formulation Examples 10 mg. tablets are prepared from the following compositions:

| | Mg. |
|---|---|
| Compound A | 10 |
| Lactose | 68 |
| Starch | 20 |
| Microcrystalline Cellulose | 20 |
| Methyl Cellulose | 1 |
| Magnesium Stearate | 1 |
| | 120 |

25 mg. tablets are prepared from the following compositions:

| | Mg. |
|---|---|
| Compound A | 25 |
| Lactose | 53 |
| Starch | 35 |
| Microcrystalline Cellulose | 35 |
| Methyl Cellulose | 1 |
| Magnesium Stearate | 1 |
| | 150 |

10% powders are prepared from the following compositions:

| | Percent |
|---|---|
| Compound A | 10 |
| Lactose | 70 |
| Starch | 19 |
| Methyl Cellulose | 1 |
| | 100 |

The oral daily dose of compound (I) or a salt thereof for human adults usually ranges from about 30 to 150 milligrams, in single or multiple dose, but it may be changed depending upon the age and/or symptoms of the patients.

The present invention will be better understood from the following examples which are illustrative and not limitative of the present invention.

Example 1

A mixture of 7 g. of 11-(3-bromopropylidene)-6,11-dihydro-dibenz[b,e]oxepin, 4.9 g. of 1-(2-thenyl)piperazine, 4.5 g. of potassium carbonate, 30 ml. of toluene and 30 ml. of dimethylformamide is heated at 110-120° C. with stirring for 7 hours. After cooling, water is added to the reaction mixture, the whole is extracted with toluene and the toluene layer is washed with water. A stoichiometrically slightly excessive amount of concentrated hydrochloric acid is added to the toluene layer, and the whole is shaken. A jelly-like substance is liberated. The toluene liquor is removed by decantation, and isopropyl alcohol is added to the jelly to cause crystallization. Recrystallization from 80% methanol give 6.5 g. of 11-[3-(4-(2-thenyl)-1-piperazinyl)propylidene] - 6,11 - dihydrodibenz[b,e]oxepin dihydrochloride melting at 257–258° C. (decomposition).

Example 2

A mixture of 6.2 g. of 11-[3-(1-piperazinyl)propylidene]-6,11-dihydro-dibenz[b,e]oxepin, 3 g. of 2-thenylchloride, 3.5 g. of potassium carbonate and 70 ml. of acetone is refluxed for 3 hours. The acetone is distilled off, water is added, and the mixture is extracted with toluene. The workup procedure described in Example 1 gives 5.5 g. of 11-[3-(4-(2-thenyl)-1-piperazinyl)propylidene] - 6,11 - dihydro-dibenz[b,e]oxepin dihydrochloride melting at 257–258° C. (decomposition).

Example 3

A mixture of 8 g. of 11-(3-bromopropylidene)-6,11-dihydro-dibenz[b,e]oxepin, 4 g. of 1-(3-pyridylmethyl) piperazine, 4 g. of potassium carbonate, 30 ml. of toluene and 30 ml. of dimethylformamide is heated at 110–120° C. with stirring for 7 hours. After cooling, water is added to the reaction mixture, and the whole is extracted with toluene. The extract is washed with water, and extracted with dilute hydrochloric acid. The aqueous extract is made alkaline with potassium carbonate, and the liberated oil is extracted with chloroform. The chloroform is removed, and the oily residue is dissolved in 30% ethanolic hydrochloric acid. After removal of the ethanol by distillation, isopropanol and a little amount of water are added to the solution to cause crystallization. Recrystallization of the product from 80% ethanol gives 6 g. of 11-[3-(4-(3-pyridylmethyl)-1-piperazinyl)propylidene] - 6,11 - dihydro - dibenz[b,e]oxepin trihydrochloride monohydrate melting at 237° C. (decomposition).

Using the procedure set forth in the above examples, but substituting equivalent amounts of the appropriate starting materials, the following compounds are also produced:

2. A compound of Claim 1: 11-[3-(4-(3-pyridylmethyl)-1-piperazinyl)propylidene] - 6,11 - dihydro - dibenz[b,e]oxepin.

3. A compound of Claim 1: 11-[3-(4-(2-pyridylmethyl) - 1 - piperazinyl)propylidene] - 6,11 - dihydro-dibenz[b,e]oxepin.

4. A compound of Claim 1: 11-[3-(4-(4-pyridylmethyl) - 1 - piperazinyl)propylidene] - 6,11 - dihydro-dibenz[b,e]oxepin.

5. A compound of Claim 1: 5-[3-(4-(2-(4-pyridyl)-1-piperazinyl)propylidene] - 10,11 - dihydrodibenz[a,d]cycloheptene.

6. A compound of Claim 1: 5-[3-(4-(2-pyridylmethyl) - 1 - piperazinyl)propylidene]-10,11-dihydro-dibenz[a,d]cyclohepten.

7. A compound of Claim 1: 5-[3-(4-(3-pyridylmethyl) - 1 - piperazinyl)propylidene] - dibenz[a,d]cycloheptene.

8. A pharmaceutical composition comprising the compound of Claim 1 in combination with a pharmaceutically acceptable inert carrier, said compound being present in a psycho-therapeutically effective amount.

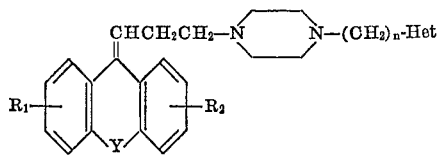

| Example | Y | $R^1$ | $R^2$ | n | Het | Salt and M.P. (° C.) |
|---|---|---|---|---|---|---|
| 4 | —CH$_2$—O— | H | H | 1 | 2-furyl | 2 maleate, 184–186. |
| 5 | —CH$_2$—O— | H | H | 1 | 4-pyridyl | 3 HCl H$_2$O, 240 (d*). |
| 6 | —CH$_2$—O— | H | H | 1 | 2-pyridyl | 2 maleate, 172 (d*). |
| 7 | —CH$_2$—O— | H | 2-Cl | 1 | ...do | 2 HCl, 264–265 (d*). |
| 8 | —CH$_2$—O— | H | 2-Cl | 1 | 3-pyridyl | 3 HCl, 259–261 (d*). |
| 9 | —CH$_2$—O— | H | 2-CH$_3$ | 1 | 4-pyridyl | 3 HCl, H$_2$O 254 (d*). |
| 10 | —CH$_2$—O— | H | H | 2 | 2-pyridyl | 3 HCl, ½ H$_2$O 177–180 (d*). |
| 11 | —CH$_2$—O— | H | H | 2 | 4-pyridyl | 3 HCl H$_2$O 198–200 (d*). |
| 12 | —CH$_2$—O— | H | 2-OCH$_3$ | 2 | ...do | 3 HCl H$_2$O 184–185 (d*). |
| 13 | —CH$_2$—O— | H | 2-Cl | 2 | ...do | 3 HCl H$_2$O 223–225 (d*). |
| 14 | —CH$_2$—O— | H | H | 0 | 2-pyridyl | 2 maleate 145 (d*). |
| 15 | —CH$_2$—S— | H | H | 1 | 2-thienyl | 2 HCl 255–257 (d*). |
| 16 | —CH$_2$—S— | H | H | 2 | 4-pyridyl | 3 HCl 145 (d*). |
| 17 | —CH$_2$—SO$_2$— | H | H | 2 | ...do | 3 maleate 147–149. |
| 18 | —CH$_2$—CH$_2$— | H | H | 1 | 2-pyridyl | 3 HCl ½ H$_2$O 235 (d*). |
| 19 | —CH$_2$—CH$_2$— | H | 3-Cl | 1 | 4-pyridyl | 3 HCl H$_2$O 241 (d*). |
| 20 | —CH$_2$—CH$_2$— | H | 3-CH$_3$ | 1 | 2-pyridyl | 3 HCl ,H$_2$O 237 (d*). |
| 21 | —CH$_2$—CH$_2$— | H | H | 1 | 4-pyridyl | 3 HCl 236 (d*). |
| 22 | —CH$_2$—CH$_2$— | H | H | 2 | ...do | 3 HCl H$_2$O 192 (d*). |
| 23 | —CH=CH— | H | H | 1 | 3-pyridyl | 3 HCl ½ H$_2$O 249 (d*). |
| 24 | —CH=CH— | H | H | 2 | 4-pyridyl | 3 maleate 158 (d*). |
| 25 | —C(CH$_3$)$_2$— | H | H | 1 | 2-thienyl | 2 HCl 267 (d*). |
| 26 | —O— | H | 2-OCH$_3$ | 1 | 4-pyridyl | 3 maleate 125. |
| 27 | —S— | H | 2-SCH$_3$ | 1 | ...do | 3 HCl H$_2$O 225 (d*). | d*=Decomposition.

What is claimed is:

1. An N-substituted piperazine compound of the formula:

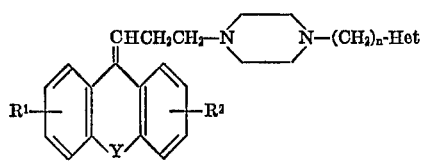

wherein Y is —CH$_2$—O—, —CH$_2$—S—, CH$_2$—SO$_2$—, —CH$_2$—CH$_2$—, —CH=CH—, —C(CH$_3$)$_2$—, —O— or —S—, each of $R^1$ and $R^2$ is H, C$_{1-4}$ alkyl, methoxy, methylthio or halogen, n is 0, 1, 2 or 3 and Het represents 2 furyl, pyridyl or 2 thienyl; and pharmaceutically acceptable acid addition salts thereof.

References Cited

UNITED STATES PATENTS

| 3,290,300 | 12/1966 | Cusic et al. | 260—240 TC |
| 3,377,344 | 4/1968 | Cusic et al. | 260—240 TC |
| 3,354,155 | 11/1967 | Tretter | 260—240 TC |

FOREIGN PATENTS

| 248,446 | 7/1966 | Austria | 260—240 TC |

OTHER REFERENCES

Burger, Medicinal Chemistry, vol. 1, frontispage and pp. 44–48, Interscience Publishers, Inc., New York (1951).

JOHN D. RANDOLPH, Primary Examiner

U.S. Cl. X.R.

260—240.1; 424—250